United States Patent [19]

Nadd

[11] Patent Number: 5,828,184
[45] Date of Patent: Oct. 27, 1998

US005828184A

[54] LAMP BALLAST DRIVE CIRCUIT HAVING A RESISTOR IN PLACE OF BOOT STRAP DIODE

[75] Inventor: Bruno C. Nadd, Puyvert, France

[73] Assignee: International Rectifier Corporation, El Segundo, Calif.

[21] Appl. No.: 786,768

[22] Filed: Jan. 21, 1997

[51] Int. Cl.⁶ .................................................. H05B 37/02
[52] U.S. Cl. ..................... 315/209 R; 315/224; 315/291; 315/307; 315/DIG. 7
[58] Field of Search ................................ 315/209 R, 224, 315/291, 293, 307, 247, 308, DIG. 7; 363/24, 50, 98

[56] References Cited

U.S. PATENT DOCUMENTS

| | | | |
|---|---|---|---|
| 4,415,839 | 11/1983 | Lesea | 315/308 |
| 5,387,847 | 2/1995 | Wood | 315/209 R |
| 5,550,436 | 8/1996 | Houk | 315/209 R |
| 5,612,597 | 3/1997 | Wood | 315/293 |

*Primary Examiner*—Robert J. Pascal
*Assistant Examiner*—Haissa Philogene
*Attorney, Agent, or Firm*—Ostrolenk, Faber, Gerb & Soffen, LLP

[57] ABSTRACT

A lamp ballast drive circuit uses a resistor in place of a boot strap diode and drives a gas discharge illumination device. A pair of power devices are arranged in a half bridge configuration. A self oscillating driver circuit has output terminals connected to the power devices, respectively, a high side supply terminal, and a high side offset terminal that is coupled to the node between the power devices. A boot strap capacitor is coupled between the high side supply terminal and the high side offset terminal. A resistor is coupled between the voltage source and the high side supply terminal.

25 Claims, 2 Drawing Sheets

LAMP BALLAST DRIVE CIRCUIT HAVING A RESISTOR IN PLACE OF BOOT STRAP DIODE

CROSS-REFERENCE TO RELATED APPLICATIONS

This application claims the benefit of U.S. Provisional Application Ser. No. 60/010,954, filed Feb. 1, 1996, and entitled "Resistor in Place of Boot Strap Diode for Ballast Circuit" to Bruno C. Nadd, the present applicant.

FIELD OF THE INVENTION

This invention relates to lamp ballast circuits and, more specifically, relates to a drive circuit for driving MOS gated power semiconductor devices, such as power MOSFETs, which control the driving of a lamp ballast.

BACKGROUND OF THE INVENTION

It is well known that MOS gated power semiconductor devices, such a power MOSFETs, can be connected in a half bridge configuration as "high side" and "low side" power devices and turned on and off in a desired sequence to provide the controlled input power to a lamp ballast. Driver chips, which are integrated circuits for driving such MOSFETs, are also well known. For example, the part number IR51H737 or any part of the family of parts IR51HXXX made by the International Rectifier Corporation of El Segundo, Calif. can provide the output drive to a pair of series connected power devices for driving a fluorescent lamp ballast. Another driver chip useful for this purpose is the family of part numbers IR215X, also made by the International Rectifier Corporation.

Because one of outputs must be at a voltage higher than that of the voltage supply, the drivers typically require a "boot strap" circuit consisting of a capacitor and diode. The diode in the boot strap circuit must be a fast recovery diode and generally costs about $0.06, which may be too expensive for certain applications. It would therefore be desirable to use a less expensive part in place of the boot strap diode.

BRIEF DESCRIPTION OF THE INVENTION

In accordance with the invention, a resistor is substituted for the conventional boot strap diode. Unexpectedly, the diode can be replaced by a resistor in a ballast application.

According to an aspect of the invention, a circuit drives a pair of power devices that are arranged in a half bridge configuration. A first terminal of the half bridge is coupled to a voltage source, and a second terminal is coupled to a ground potential. A common terminal is located at a node between the power devices and supplies an output signal to the load circuit. A self-oscillating driver circuit includes first and second output terminals each respectively coupled to one of the pair of power devices and includes a high side supply terminal as well as a high side offset terminal that is coupled to the node between the pair of power devices. A bootstrap capacitor is coupled between the high side supply terminal and the high side offset terminal. A resistor is coupled between the voltage source and the high side supply terminal.

In accordance with this aspect of the invention, a clamping device may be coupled between the high side supply terminal and the high side offset terminal and may comprise a zener diode. A pull-down resistor may be coupled between the ground potential and the node located between the pair of power devices.

The pair of power devices may be MOS gated power semiconductor devices and may be a pair of MOSFETs. The voltage source may be a regulated d-c power supply and may be delivered by a rectifier from an a-c main supply.

According to another aspect of the invention, a circuit drives a load circuit.

According to a further aspect of the invention the circuit drives a gas discharge illumination device. A gas discharge illumination device may be a fluorescent lamp, a high intensity discharge lamp, or a high pressure sodium lamp.

Other features and advantages of the present invention will become apparent from the following description of the invention which refers to the accompanying drawings.

BRIEF DESCRIPTION OF THE DRAWINGS

The invention will now be described in greater detail and the following detailed description with reference to the drawings in which.

DETAILED DESCRIPTION OF THE DRAWINGS

Figure 1:
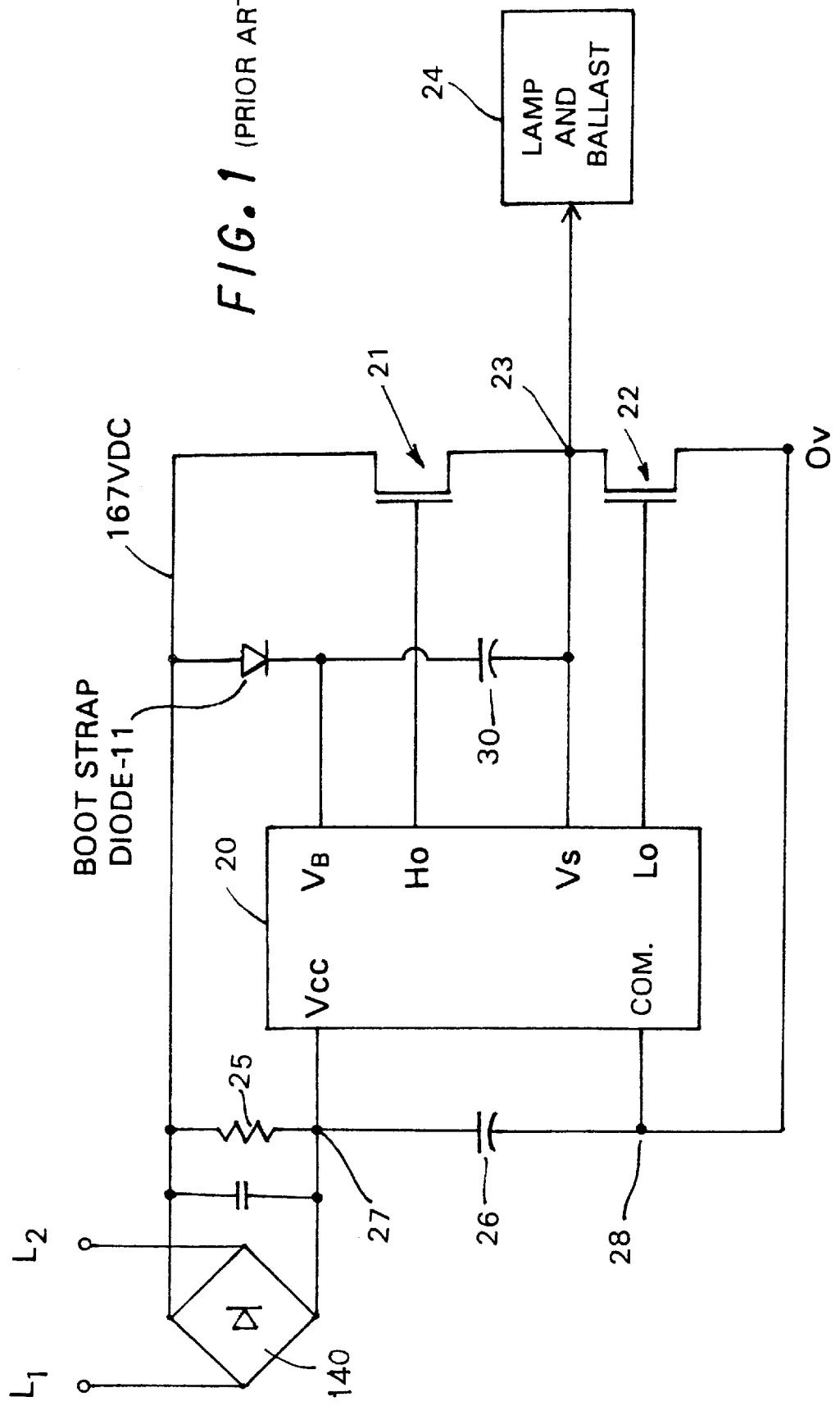
FIG. 1 shows a schematic diagram of a prior art electronic ballast circuit.

FIG. 1 shows a schematic diagram of a prior art driver circuit. More particularly, the circuit of FIG. 1 includes a gate driver chip 20 and its associated circuitry for controlling the operation of a high side MOSFET 21 and a low side MOSFET 22. The gate driver chip 20 provides drive signals to the MOSFETs 21 and 22 which are connected in a half bridge configuration between a 167 volt d-c supply terminal and a ground terminal. Though power MOSFETs are shown, any power device which has an MOS gate, such as an IGBT or an MOS gated thyristor, may be substituted for power MOSFETs 21 and 22.

The output of the center tap of the half bridge connected MOSFETs 21 and 22 drives a lamp and ballast circuit 24.

In more detail, the circuit of FIG. 1 employs a well-known ballast driver chip 20, which may be an IR51H737 driver available from the International Rectifier Corporation of El Segundo, Calif., though any of the chips of the family IR51HXXX may be used. Alternatively, an International Rectifier Corporation part in the family IR215X could be used.

Though these chips have multiple pins, only the relevant ones to this invention are shown, including:

$V_{CC}$—a regulated voltage supply pin which receives a chip operating voltage from a d-c supply, COM—a ground or zero voltage pin which is connected to the negative or ground of a d-c source, $V_B$—a high side supply terminal which provides power for the operation of the high side switch, $H_O$—a high side gate voltage output pin to the gate of high side MOSFET 21, $V_S$—a high side effect output pin to the center tap 23 of the half bridge connected MOSFETs 21 and 22 which swings high and low, and $L_O$—a low side gate voltage output pin to the gate of low side MOSFET 22.

The high voltage rail at 167 volts d-c is also connected in the usual manner to resistor 25 and to capacitor 26 with node 27 therebetween connected to pin $V_{cc}$. The d-c voltage may be delivered by a rectified a-c main supply 40. The node 28 (zero volts) is connected to pin COM.

In order to produce a voltage higher than the voltage $V_B$, which is needed at $H_O$ to turn on the high side MOSFET 21, a boot strap circuit, including capacitor 30 and the prior art diode 11 is necessary. As pointed out previously, because it must be a fast recovery diode, the diode 11 is relatively expensive for certain applications, such as for compact fluorescent lamps, in which cost is a controlling factor.

It has been found that, when the output load is a ballast, it is possible to employ a resistor in place of the diode 11 and still obtain acceptable performance.

Figure 2:
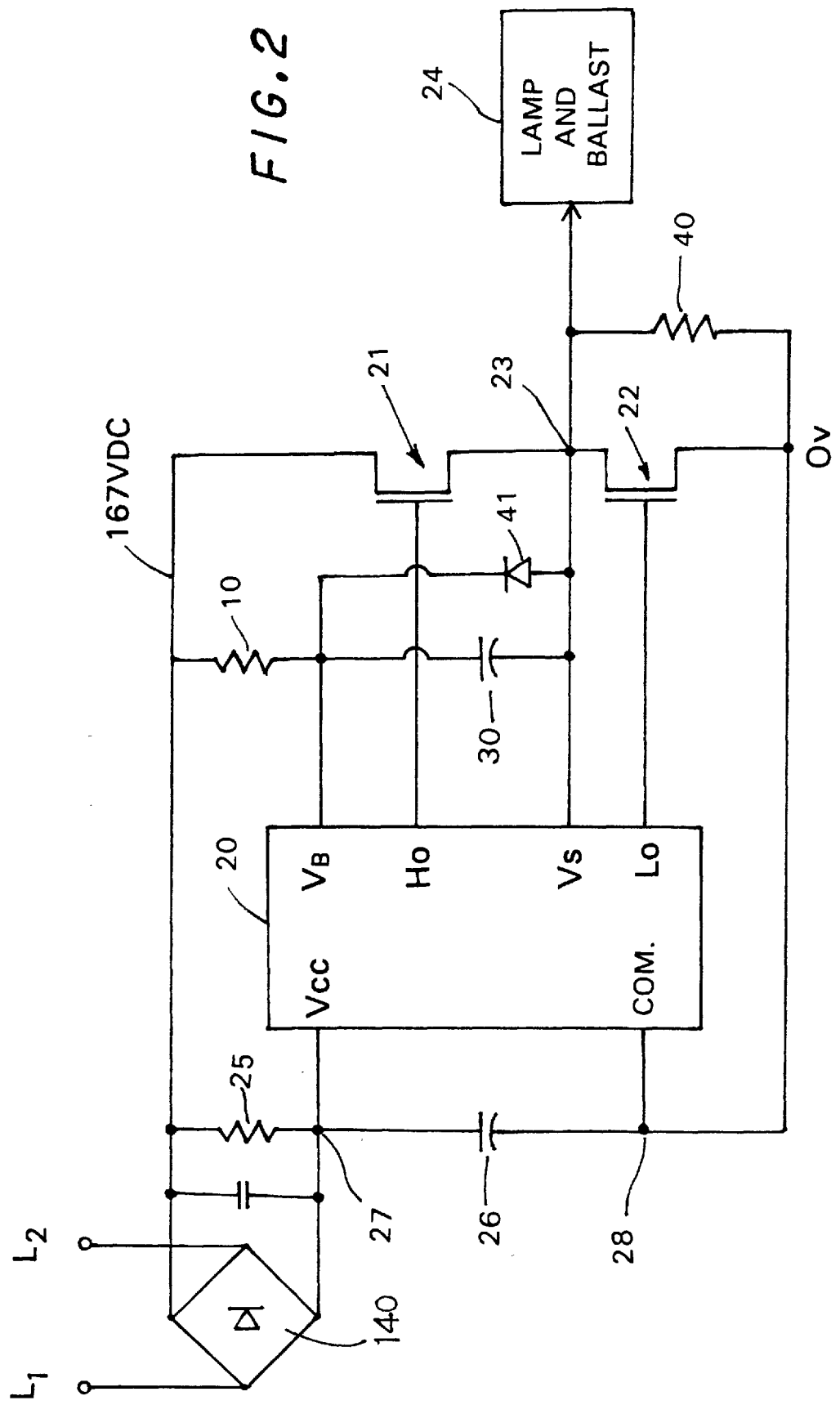
FIG. 2 shows a schematic diagram of the circuit of the present invention.

Referring to FIG. 2, the novel circuit of the invention is shown, wherein the inexpensive resistor 10 replaces the prior art boot strap diode 11 shown in FIG. 1. Typically, a 60K-ohm resistor is used, which costs less than about 1 cent (U.S.) whereas the diode 11 costs about 5 cents (U.S.).

In the circuit of FIG. 2, a pull down resistor 40 inserted between node 23 and the ground terminal to ensure that the boot strap capacitor 30 is charged up prior to turning on the high side MOSFET 21. The pull-down resistor 40 may be 470K-ohm resistor. The R-C product for the boot strap capacitor 30 must be smaller than the R-C product for the $V_{CC}$ capacitor 26.

It is also be desirable to add a $V_{BS}$ clamping zener diode 41 as shown. Alternatively, such a clamp can be integrated into the chip 20. The resistor 40 and zener diode 41 add a very small cost that is far less than the savings obtained by substituting resistor 10 for diode 11.

Advantageously, the resistance value of $V_{CC}$ dropping resistor 25 can be increased using the present design because the current that must be supplied is less than that supplied of the prior art design. As a further advantage, the average voltage drop across resistor 10 is $(V_{DC}-2V_{BS})/2$ because of the 50% duty cycle of MOSFETs 21 and 22. Thus, a 60K-ohm resistor can satisfactorily be used for resistor 10 when a 110V a-c system is rectified to produce 167 volt d-c output on the high voltage rail of FIG. 2. Furthermore, the resistor 10 does not dissipate any more power than the prior art diode 11. Moreover, it is possible to divide the power dissipated by resistor 10 into two or more individual and spaced resistors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for driving a pair of power devices arranged in a half bridge configuration in which a first terminal is coupled to a voltage source and a second terminal is coupled to a ground potential and having a common terminal located at a node between the power devices for supplying an output signal to a load circuit; said driving circuit comprising;

a self oscillating driver circuit having first and second output terminals each coupled to a respective one of said pair of power devices, a high side supply terminal, and a high side offset terminal coupled to said node between said power devices; and a bootstrap circuit comprising a capacitor coupled between said high side supply terminal and said high side offset terminal, and a resistor directly connected between said voltage source and said high side supply terminal.

2. The circuit of claim 1 further comprising a clamping device coupled between said high side supply terminal and said high side offset terminal.

3. The circuit of claim 2 wherein said clamping device is a zener diode.

4. The circuit of claim 1 further comprising a pull-down resistor coupled between said node and said ground potential.

5. The circuit of claim 1 wherein said pair of power devices are MOS gated power semiconductor devices.

6. The circuit of claim 1 wherein said pair of power devices are MOSFETs.

7. The circuit of claim 1 wherein said voltage source is a regulated d-c power supply.

8. The circuit of claim 7 wherein said d-c supply is delivered by a rectifier from an a-c main supply.

9. A circuit for driving a load circuit, said driving circuit comprising:

a pair of power devices arranged in a half bridge configuration having a first terminal coupled to a voltage source and a second terminal coupled to a ground potential and having a common terminal located at a node between said power devices for supplying an output signal to the load circuit;

a self oscillating driver circuit having first and second output terminals each coupled to a respective one of said pair of power devices, a high side supply terminal, and a high side offset terminal coupled to said node between said power devices; and a bootstrap circuit comprising a capacitor coupled between said high side supply terminal and said high side offset terminal, and a resistor directly connected between said voltage source and said high side supply terminal.

10. The circuit of claim 9 further comprising a clamping device coupled between said high side supply terminal and said high side offset terminal.

11. The circuit of claim 10 wherein said clamping device is a zener diode.

12. The circuit of claim 9 further comprising a pull-down resistor coupled between said node and said ground potential.

13. The circuit of claim 9 wherein said pair of power devices are MOS gated power semiconductor devices.

14. The circuit of claim 9 wherein said pair of power devices are MOSFETs.

15. The circuit of claim 9 wherein said voltage source is a regulated d-c power supply.

16. The circuit of claim 15 wherein said d-c supply is delivered by a rectifier from an a-c main supply.

17. A lamp ballast drive circuit for driving a gas discharge illumination device, said circuit comprising:

a pair of power devices arranged in a half bridge configuration having a first terminal coupled to a voltage source and a second terminal coupled to a ground potential and having a common terminal located at a node between said power devices for supplying an output signal to a ballast circuit;

a self oscillating driver circuit having first and second output terminals each coupled to a respective one of said pair of power devices, a high side supply terminal, and a high side offset terminal coupled to said node between said power devices; and bootstrap circuit comprising a capacitor coupled between said high side supply terminal and said high side offset terminal, and a resistor directly connected between said voltage source and said high side supply terminal.

18. The circuit of claim 17 further comprising a clamping device coupled between said high side supply terminal and said high side offset terminal.

19. The circuit of claim 18 wherein said clamping device is a zener diode.

20. The circuit of claim 17 further comprising a pull-down resistor coupled between said node and said ground potential.

21. The circuit of claim 17 wherein said pair of power devices are MOS gated power semiconductor devices.

22. The circuit of claim 17 wherein said pair of power devices are MOSFETs.

23. The circuit of claim 17 wherein said voltage source is a regulated d-c power supply.

24. The circuit of claim 23 wherein said d-c supply is delivered by a rectifier from an a-c main supply.

25. The circuit of claim 17 wherein said gas discharge illumination device comprises one of a fluorescent lamp, a high intensity discharge lamp and a high pressure sodium lamp.

* * * * *

UNITED STATES PATENT AND TRADEMARK OFFICE
CERTIFICATE OF CORRECTION

PATENT NO. : 5,828,184
DATED : October 27, 1998
INVENTOR(S) : Nadd

It is certified that error appears in the above-identified patent and that said Letters Patent is hereby corrected as shown below:

Column 2, line 66, "40" should read --140--.

Signed and Sealed this

Fourth Day of May, 1999

Attest:

Q. TODD DICKINSON

*Attesting Officer*     Acting Commissioner of Patents and Trademarks